(12) United States Patent
Paredes Cabrera et al.

(10) Patent No.: US 11,695,527 B2
(45) Date of Patent: Jul. 4, 2023

(54) CORESET SEARCH AREA OPTIMIZATION

(71) Applicant: Telefonaktiebolaget LM Ericsson (publ), Stockholm (SE)

(72) Inventors: Ricardo Paredes Cabrera, Ottawa (CA); Oscar Filio Rodriguez, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/774,257

(22) PCT Filed: Nov. 5, 2020

(86) PCT No.: PCT/IB2020/060435
§ 371 (c)(1),
(2) Date: May 4, 2022

(87) PCT Pub. No.: WO2021/090244
PCT Pub. Date: May 14, 2021

(65) Prior Publication Data
US 2022/0407649 A1 Dec. 22, 2022

Related U.S. Application Data

(60) Provisional application No. 62/930,835, filed on Nov. 5, 2019.

(51) Int. Cl.
*H04W 4/00* (2018.01)
*H04L 5/00* (2006.01)

(52) U.S. Cl.
CPC .................. *H04L 5/0048* (2013.01)

(58) Field of Classification Search
CPC ... H04L 5/0048; H04L 5/0053; H04L 5/0094; H04L 72/21; H04L 72/23; H04W 74/0833
(Continued)

(56) References Cited

U.S. PATENT DOCUMENTS

2018/0376511 A1 12/2018 Tsai et al.
2020/0022119 A1* 1/2020 Wang .................... H04L 5/0091
(Continued)

FOREIGN PATENT DOCUMENTS

| JP | 2020048111 A | * | 3/2020 | ............ H04W 72/08 |
| WO | 2019/066557 A1 | | 4/2019 | |
| WO | WO-2020059419 A1 | * | 3/2020 | ............ H04W 72/08 |

OTHER PUBLICATIONS

International Search Report and Written Opinion dated Feb. 12, 2021 issued in PCT Application No. PCT/IB2020/060435, consisting of 11 pages.
(Continued)

*Primary Examiner* — Maharishi V Khirodhar
(74) *Attorney, Agent, or Firm* — Christopher & Weisberg, P.A.

(57) ABSTRACT

A method, system and apparatus are disclosed. According to some embodiments, a network node for communicating with a first wireless device is provided. The network node includes processing circuitry configured to: assign a control resource set, CORESET, search area identifier, CS-ID, to a first wireless device, and cause signaling of a CORESET including data for a first wireless device where the data is searchable within the CORESET based at least on an offset derivable from the CS-ID.

19 Claims, 9 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2021/0168775 A1* | 6/2021 | Hang ..................... | H04L 5/0053 |
| 2021/0409094 A1* | 12/2021 | Yuan ..................... | H04W 24/08 |
| 2022/0225330 A1* | 7/2022 | Xu ......................... | H04L 5/0053 |

OTHER PUBLICATIONS

3GPP TS 38.211 V15.6.0 (Jun. 2019) 3rd Generation Partnership Project; Technical Specification Group Radio Access Network; NR; Physical Channels and Modulation (Release 15), consisting of 97 pages.
3GPP TS 38.213 V15.6.0 (Jun. 2019) 3rd Generation Partnership Project; Technical Specification Group Radio Access Network; NR; Physical Layer Procedures for Control (Release 15), consisting of 107 pages.
3GPP TS 38.331 V15.6.0 (Jun. 2019) 3rd Generation Partnership Project; Technical Specification Group Radio Access Network; NR; Radio Resource Control (RRC) Protocol Specification (Release 15), consisting of 519 pages.

* cited by examiner

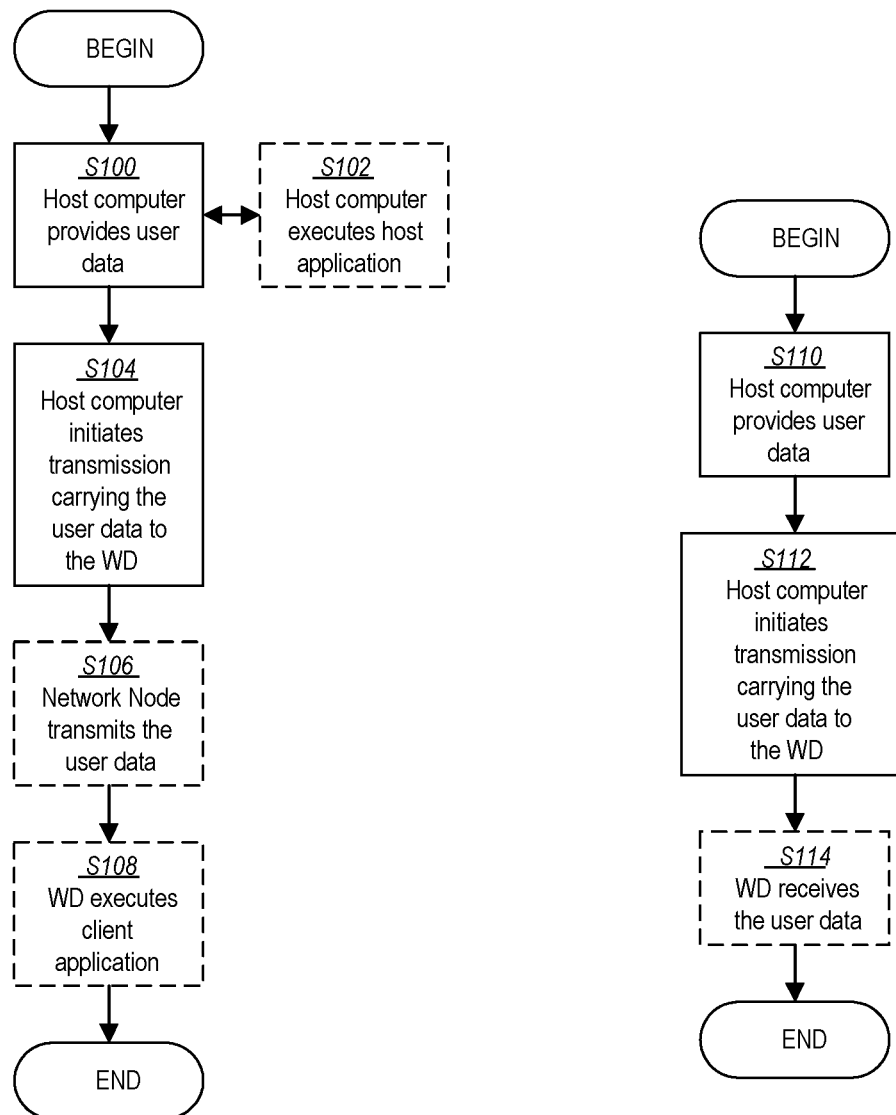

CORESET SEARCH AREA OPTIMIZATION

CROSS-REFERENCE TO RELATED APPLICATIONS

This application is a Submission Under 35 U.S.C. § 371 for U.S. National Stage Patent Application of International Application No.: PCT/IB2020/060435, filed Nov. 5, 2020 entitled "CORESET SEARCH AREA OPTIMIZATION," which claims priority to U.S. Provisional Application No. 62/930,835, filed Nov. 5, 2019, entitled "5G CORESET SEARCH AREA OPTIMIZATION," the entireties of both of which are incorporated herein by reference.

TECHNICAL FIELD

The present disclosure relates to wireless communications, and in particular, to limiting unnecessary control area searching by a wireless device.

BACKGROUND

Currently, in Long Term Evolution (LTE) and in 5th Generation (5G) (also known as "New Radio (NR)") standards promulgated by the 3rd Generation Partnership Project (3GPP), the physical downlink control channel (PDCCH) search region may contain wireless device (WD) specific and common areas for the WDs to read their control data. Each WD may need to search the area to find the WD's PDCCH data. For WDs that do not have any control data, it may be a waste of resources to search the entire area to verify that there is no data for that WD.

SUMMARY

Some embodiments advantageously provide methods, systems, and apparatuses for limiting unnecessary searching of the control area by, for example, sending an indication to a WD that indicates if the WD is to read a control resource set (CORESET) search space in a bandwidth part (BWP), and/or configuring an offset for searching the CORESET search space. This prevents a WD from wasting system resources resulting from unnecessarily searching the control area when there is no data for the WD to retrieve from the control area.

According to one aspect of the disclosure, a network node for communicating with a first wireless device is provided. The network node includes processing circuitry configured to: assign a control resource set, CORESET, search area identifier, CS-ID, to a first wireless device; and cause signaling of a CORESET including data for a first wireless device where the data is searchable within the CORESET based at least on an offset derivable from the CS-ID.

According to one or more embodiments, the CORESET includes a bitmap including a plurality of bits associated with a plurality of wireless devices where the offset associated with the CS-ID is an offset into the bitmap that corresponds to a first bit of the plurality of bits that is associated with the first wireless device and where the first bit configured to indicate whether the data is included in the CORESET for the first wireless device. According to one or more embodiments, the first bit corresponding to a first predefined value indicates for the first wireless device to search for control data in the CORESET, and where the first bit corresponds to a second predefined value indicates for the first wireless device to skip searching for control data in the CORESET. According to one or more embodiments, the offset associated with the CS-ID corresponds to an offset into a common search area of the CORESET where the data included in the CORESET is positioned at the offset.

According to one or more embodiments, the data is encoded for the first wireless device, in the common search area of the CORESET, only at the offset. According to one or more embodiments, the data is encoded for the first wireless device, in the common search area of the CORESET, within a predefined range past the offset. According to one or more embodiments, the processing circuitry is further configured to determine the offset using the CS-ID. According to one or more embodiments, the offset is based at least on an aggregation level associated with the CORESET.

According to one or more embodiments, the processing circuitry is further configured to determine the CS-ID based at least on one of: a random access preamble ID associated with the first wireless device; wireless device service type associated with the first wireless device; discontinuous reception, DRX, cycles associate with the first wireless device; radio conditions associated with the first wireless device; and physical random access channel configuration index associated with the first wireless device. According to one or more embodiments, the processing circuitry is further configured to receive capability information from the first wireless device where the capability information indicates whether the wireless device is configured for offset based CORESET searching.

According to another aspect of the disclosure, a first wireless device for communicating with a network node is provided. The first wireless device includes processing circuitry configured to: receive an indication of an assignment of a control resource set, CORESET, search area identifier, CS-ID for the first wireless device, and receive signaling of a CORESET including data for the first wireless device where the data is searchable within the CORESET based at least on an offset derivable from the CS-ID.

According to one or more embodiments, the CORESET includes a bitmap including a plurality of bits associated with a plurality of wireless devices where the processing circuitry is configured to: determine the offset based at least on the CS-ID, the offset being an offset into the bitmap that corresponds to a first bit of the plurality of bits that is associated with the first wireless device where the first bit configured to indicate whether the data is included in the CORESET for the first wireless device. According to one or more embodiments, the first bit corresponds to a first predefined value indicates for the first wireless device to search for control data in the CORESET where the first bit corresponds to a second predefined value indicates for the first wireless device to skip searching for control data in the CORESET. According to one or more embodiments, the processing circuitry is configured to determine the offset based at least on the CS-ID where the offset is an offset into a common search area of the CORESET, and where the data included in the CORESET being positioned at the offset.

According to one or more embodiments, the processing circuitry is configured to determine the offset based at least on the CS-ID, the offset being an offset into a common search area of the CORESET, the data included in the CORESET being positioned only at the offset. According to one or more embodiments, the data included in the CORESET is positioned within a predefined range past the offset. According to one or more embodiments, the offset is based at least on an aggregation level associated with the CORESET. According to one or more embodiments, the processing circuitry (84) is further configured to determine the CS-ID based at least on one of: a random access preamble ID associated with the first wireless device; wireless device service type associated with the first wireless device; discontinuous reception, DRX, cycles associate with the first wireless device; and radio conditions associated with the first wireless device.

According to one or more embodiments, a method for a network node for communicating with a first wireless device is provided. A control resource set, CORESET, search area identifier, CS-ID, is assigned to a first wireless device. A CORESET including data for a first wireless device is caused to be signaled where the data is searchable within the CORESET based at least on an offset derivable from the CS-ID.

According to one or more embodiments, the CORESET includes a bitmap including a plurality of bits associated with a plurality of wireless devices where the offset associated with the CS-ID is an offset into the bitmap that corresponds to a first bit of the plurality of bits that is associated with the first wireless device, and where the first bit is configured to indicate whether the data is included in the CORESET for the first wireless device. According to one or more embodiments, the first bit corresponding to a first predefined value indicates for the first wireless device to search for control data in the CORESET, and where the first bit corresponding to a second predefined value indicates for the first wireless device to skip searching for control data in the CORESET. According to one or more embodiments, the offset associated with the CS-ID corresponds to an offset into a common search area of the CORESET, where the data included in the CORESET is positioned at the offset.

According to one or more embodiments, the data is encoded for the first wireless device, in the common search area of the CORESET, only at the offset. According to one or more embodiments, the data is encoded for the first wireless device, in the common search area of the CORESET, within a predefined range past the offset. According to one or more embodiments, the offset is determined using the CS-ID.

According to one or more embodiments, the offset is based at least on an aggregation level associated with the CORESET. According to one or more embodiments, the CS-ID is determined based at least on one of: a random access preamble ID associated with the first wireless device; wireless device service type associated with the first wireless device; discontinuous reception, DRX, cycles associate with the first wireless device; radio conditions associated with the first wireless device; and physical random access channel configuration index associated with the first wireless device. According to one or more embodiments, capability information is received from the first wireless device where the capability information indicates whether the wireless device is configured for offset based CORESET searching.

According to another aspect of the disclosure, a method for a first wireless device for communicating with a network node is provided. An indication of an assignment of a control resource set, CORESET, search area identifier, CS-ID for the first wireless device is received. Signaling of a CORESET including data for the first wireless device is received. The data is searchable within the CORESET based at least on an offset derivable from the CS-ID.

According to one or more embodiments, the CORESET includes a bitmap including a plurality of bits associated with a plurality of wireless devices. The offset is determined based at least on the CS-ID where the offset is an offset into the bitmap that corresponds to a first bit of the plurality of bits that is associated with the first wireless device and where the first bit is configured to indicate whether the data is included in the CORESET for the first wireless device. According to one or more embodiments, the first bit corresponds to a first predefined value indicates for the first wireless device to search for control data in the CORESET. The first bit corresponds to a second predefined value indicates for the first wireless device to skip searching for control data in the CORESET.

According to one or more embodiments, the offset based at least on the CS-ID is determined where the offset is an offset into a common search area of the CORESET, and where the data included in the CORESET is positioned at the offset. According to one or more embodiments, the offset is determined based at least on the CS-ID, where the offset is an offset into a common search area of the CORESET, and where the data included in the CORESET is positioned only at the offset. According to one or more embodiments, the data included in the CORESET is positioned within a predefined range past the offset.

According to one or more embodiments, the offset is based at least on an aggregation level associated with the CORESET. According to one or more embodiments, the CS-ID is determined based at least on one of: a random access preamble ID associated with the first wireless device; wireless device service type associated with the first wireless device; discontinuous reception, DRX, cycles associate with the first wireless device; and radio conditions associated with the first wireless device.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating example methods implemented in a communication system including a host computer, a network node and a wireless device for executing a client application at a wireless device according to some embodiments of the present disclosure;

FIG. 4 is a flowchart illustrating example methods implemented in a communication system including a host computer, a network node and a wireless device for receiving user data at a wireless device according to some embodiments of the present disclosure;

DETAILED DESCRIPTION

Figure 1:
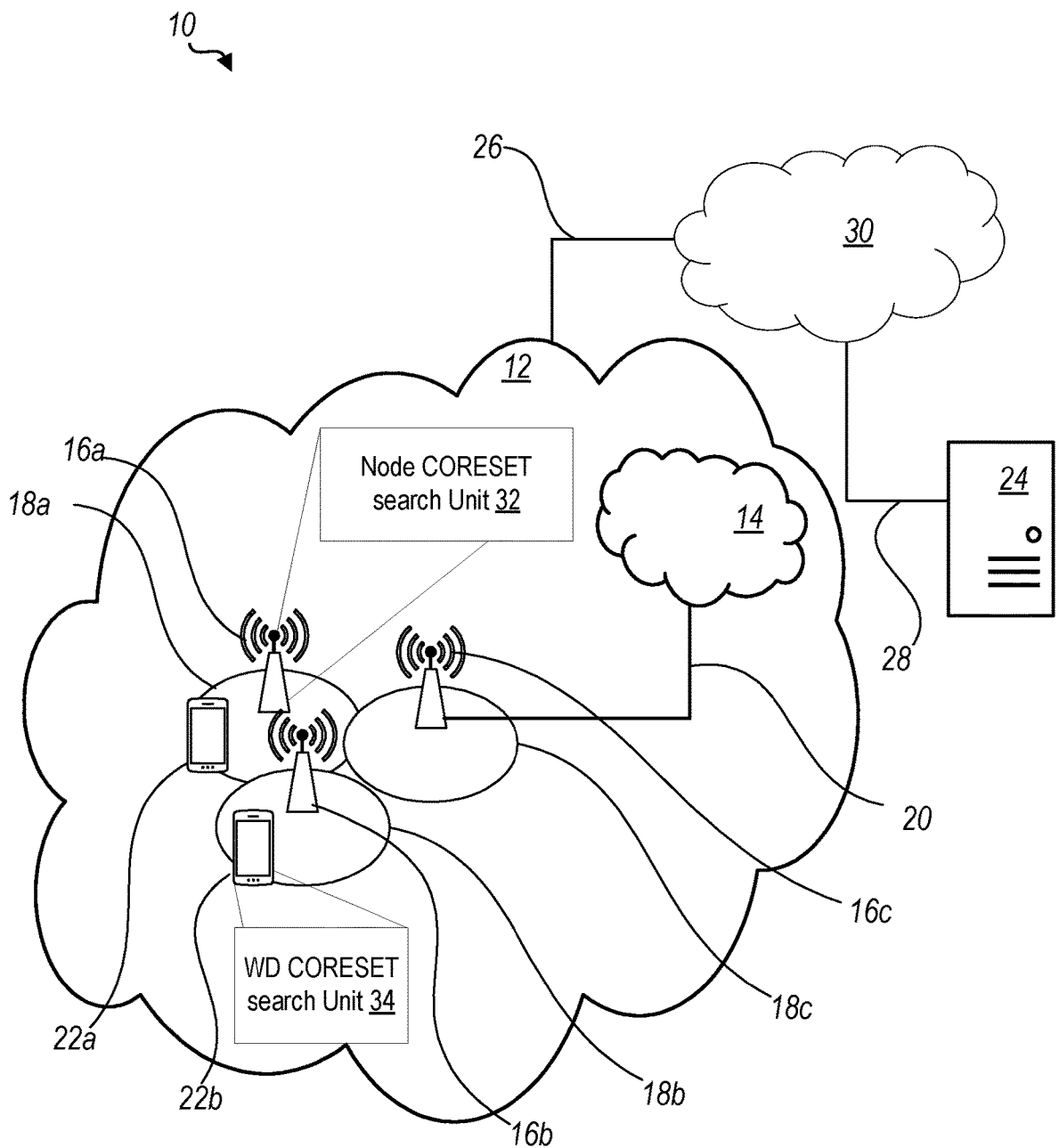
FIG. 1 is a schematic diagram of an example network architecture illustrating a communication system connected via an intermediate network to a host computer according to the principles in the present disclosure.

Before describing in detail exemplary embodiments, it is noted that the embodiments reside primarily in combinations of apparatus components and processing steps related to limiting unnecessary searching of the control area by sending an indication to a WD that indicates if the WD is to read a control resource set (CORESET) search space in a bandwidth part (BWP). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3rd Generation Partnership Project (3GPP) LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for limiting unnecessary searching of the control area by sending an indication to a WD that indicates if the WD is to read a control resource set (CORE-SET) search space in a bandwidth part (BWP).

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a node CORESET search unit 32 which is configured to send an indication to the WD 22 that indicates if the WD 22 is to read a control resource set (CORESET) search space in a bandwidth part (BWP). A wireless device 22 is configured to include a WD CORESET search unit 34 which is configured to receive an indication that indicates if the WD is to read a CORESET search space in a bandwidth part (BWP).

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include a monitoring unit 54 specifically configured to enable the service provider to monitor and/or control the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include node CORESET search unit 32 configured to send an indication to the WD that indicates if the WD is to read a control resource set (CORESET) search space in a bandwidth part (BWP).

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a WD CORESET search unit 34 configured to receive an indication that indicates if the WD is to read a CORESET search space in a bandwidth part (BWP).

Figure 2:
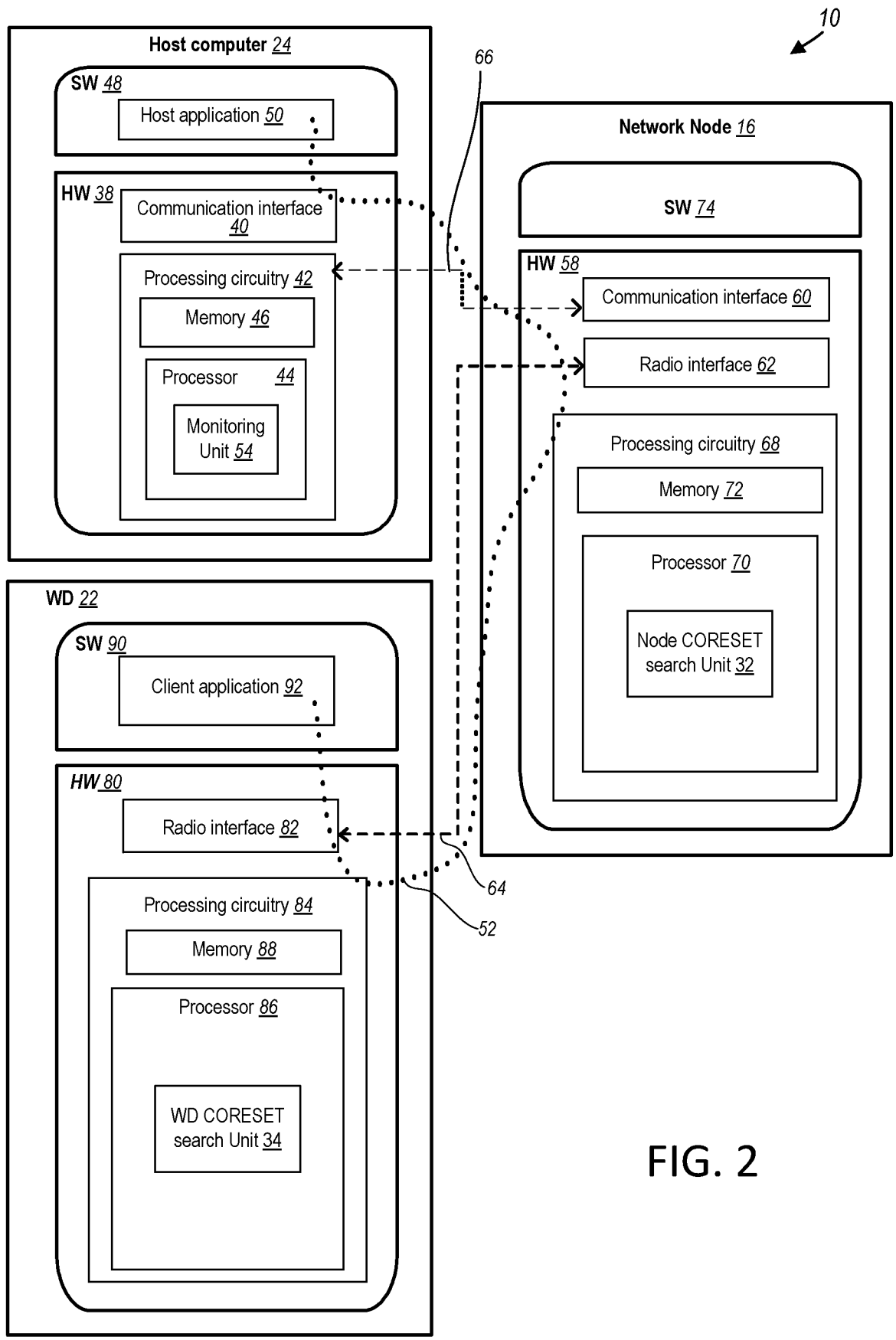
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as node CORESET search unit 32, and WD CORESET search unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 5:
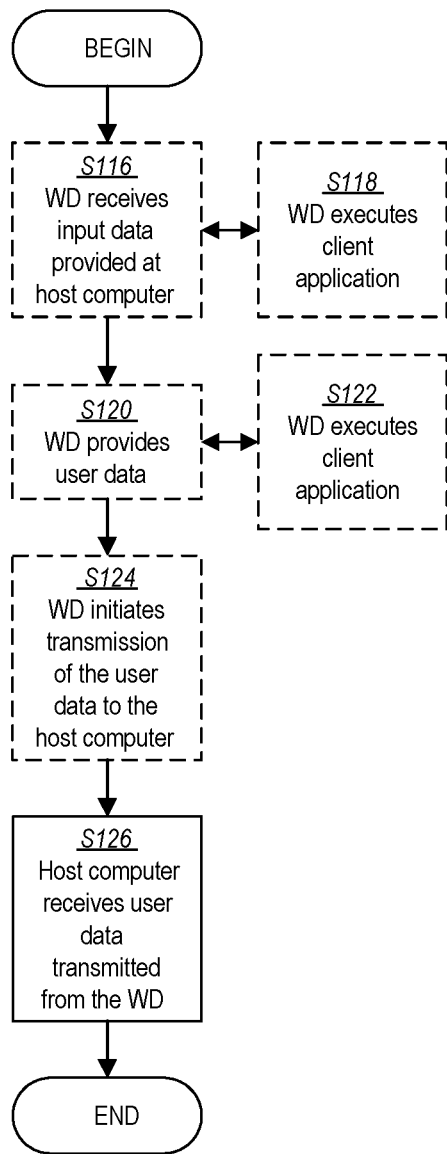
FIG. 5 is a flowchart illustrating example methods implemented in a communication system including a host computer, a network node and a wireless device for receiving user data from the wireless device at a host computer according to some embodiments of the present disclosure.

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 6:
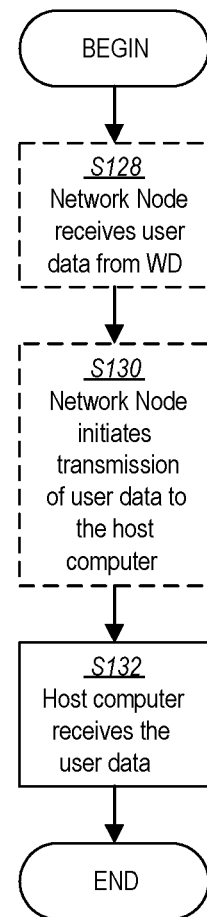
FIG. 6 is a flowchart illustrating example methods implemented in a communication system including a host computer, a network node and a wireless device for receiving user data at a host computer according to some embodiments of the present disclosure.

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
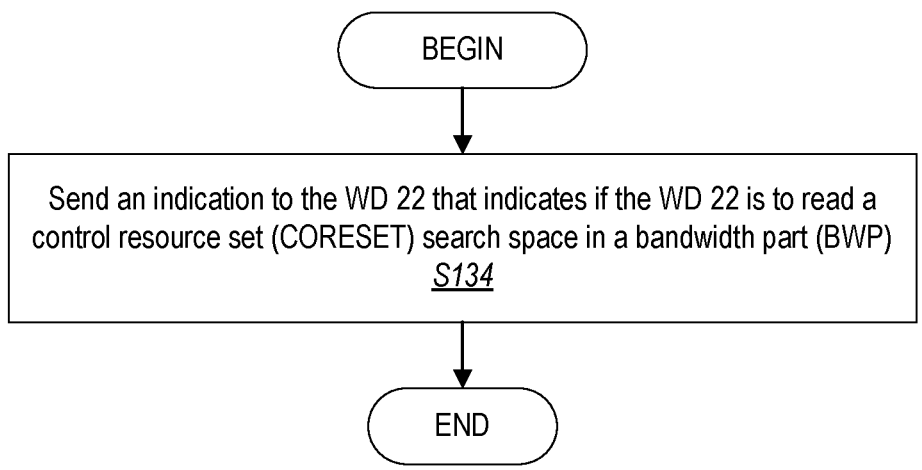
FIG. 7 is a flowchart of an example process in a network node for limiting searching of the control area according to some embodiments of the present disclosure.

FIG. 7 is a flowchart of an exemplary process in a network node 16 for limiting searching of the control area according to some embodiments of the present disclosure. One or more Blocks and/or functions performed by network node 16 may be performed by one or more elements of network node 16 such as by node CORESET search unit 32 in processing circuitry 68, processor 70, communication interface 60, radio interface 62, etc. In one or more embodiments, network node 16 such as via one or more of processing circuitry 68, processor 70, radio interface 62 and communication interface 60 is configured to send (Block S134) an indication to the WD that indicates if the WD is to read a control resource set (CORESET) search space in a bandwidth part (BWP).

In one or more embodiments, sending the indication further includes assigning a CORESET search area identifier (CS-ID) to the WD 22 that indicates if the WD 22 is to read a CORESET search space in a BWP.

In one or more embodiments, the CS-ID identifies a position on a bitmap for the WD 22 to retrieve data from that indicates if the WD 22 is to read a CORESET search space in a BWP.

In one or more embodiments, network node 16 such as via one or more of processing circuitry 68, processor 70, radio interface 62 and communication interface 60 is configured to determine if there are at least two WDs 22 sharing a CORESET search area identifier (CS-ID); and, if there are at least two WDs 22 sharing a CORESET search area identifier (CS-ID) and only one of the at least two WDs 22 has control data in a CORESET, send an indication to not search the CORESET to the WD 22 that does not have control data in CORESET.

In one or more embodiments, the CS-ID for the WD 22 is derived from a physical random-access Channel (PRACH) configuration index.

In one or more embodiments, the CS-ID is assigned to minimize interference between at least two WDS 22.

Figure 8:
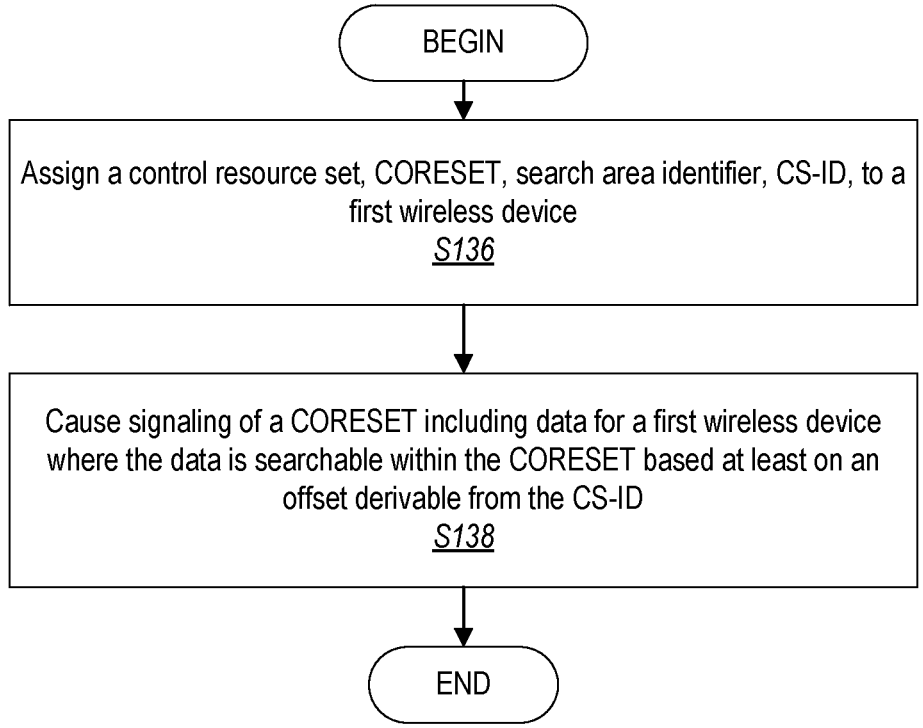
FIG. 8 is a flowchart of another example process in a network node according to some embodiments of the present disclosure.

FIG. 8 is a flowchart of another process in a network node 16 for limiting searching of the control area according to some embodiments of the present disclosure. One or more Blocks and/or functions performed by network node 16 may be performed by one or more elements of network node 16 such as by node CORESET search unit 32 in processing circuitry 68, processor 70, communication interface 60, radio interface 62, etc. In one or more embodiments, network node 16 such as via one or more of processing circuitry 68, processor 70, radio interface 62 and communication interface 60 is configured to assign (Block S136) a control resource set, CORESET, search area identifier, CS-ID, to a first wireless device 22, as described herein. In one or more embodiments, network node 16 such as via one or more of processing circuitry 68, processor 70, radio interface 62 and communication interface 60 is configured to cause (Block S138) signaling of a CORESET including data (e.g., control data) for a first wireless device 22 where the data being searchable within the CORESET based at least on an offset derivable from the CS-ID, as described herein.

According to one or more embodiments, the CORESET includes a bitmap including a plurality of bits associated with a plurality of wireless devices where the offset associated with the CS-ID is an offset into the bitmap that corresponds to a first bit of the plurality of bits that is associated with the first wireless device 22, and where the first bit is configured to indicate whether the data is included in the CORESET for the first wireless device 22. According to one or more embodiments, the first bit corresponding to a first predefined value indicates for the first wireless device 22 to search for control data in the CORESET where the first bit corresponds to a second predefined value indicates for the first wireless device 22 to skip searching for control data in the CORESET.

According to one or more embodiments, the offset associated with the CS-ID corresponds to an offset into a common search area of the CORESET where the data included in the CORESET is positioned at the offset. According to one or more embodiments, the data is encoded for the first wireless device 22, in the common search area of the CORESET, only at the offset. According to one or more embodiments, the data is encoded for the first wireless device 22, in the common search area of the CORESET, within a predefined range past the offset. According to one or more embodiments, the processing circuitry 68 is further configured to determine the offset using the CS-ID.

According to one or more embodiments, the offset is based at least on an aggregation level associated with the CORESET. According to one or more embodiments, the processing circuitry 68 is further configured to determine the CS-ID based at least on one of: a random access preamble ID associated with the first wireless device 22; wireless device service type associated with the first wireless device 22; discontinuous reception, DRX, cycles associate with the first wireless device 22; radio conditions associated with the first wireless device 22; and physical random access channel configuration index associated with the first wireless device 22. According to one or more embodiments, the processing circuitry 68 is further configured to receive capability information from the first wireless device 22 where the capability information indicates whether the wireless device 22 is configured for offset based CORESET searching.

Figure 9:
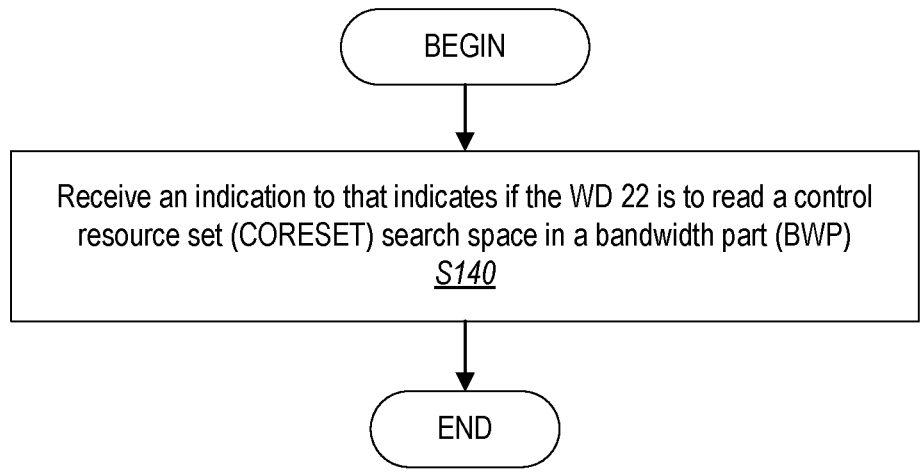
FIG. 9 is a flowchart of an example process in a wireless device for limiting searching of the control area according to some embodiments of the present disclosure.

FIG. 9 is a flowchart of an example process in a wireless device 22 for limiting searching of the control area according to some embodiments of the present disclosure. One or more Blocks and/or functions performed by wireless device 22 may be performed by one or more elements of wireless device 22 such as by WD CORESET search unit 34 in processing circuitry 84, processor 86, radio interface 82, etc. In one or more embodiments, wireless device 22 such as via one or more of processing circuitry 84, processor 86 and radio interface 82 is configured to receive (Block S138) an indication that indicates if the WD 22 is to read a control resource set (CORESET) search space in a bandwidth part (BWP).

In one or more embodiments, receiving the indication further comprises receiving a CORESET search area identifier (CS-ID) that indicates if the WD 22 is to read a CORESET search space in a BWP.

In one or more embodiments, the CS-ID identifies a position on a bitmap for the WD 22 to retrieve data from that indicates if the WD 22 is to read a CORESET search space in a BWP.

Figure 10:
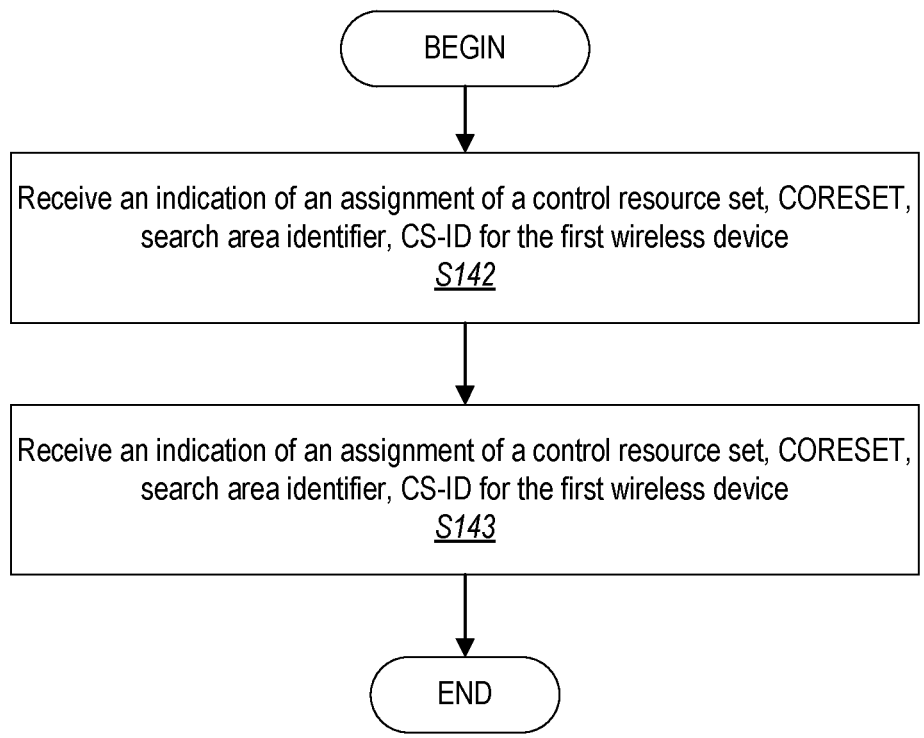
FIG. 10 is a flowchart of another example process in a wireless device for limiting searching of the control area according to some embodiments of the present disclosure.

FIG. 10 is a flowchart of an example process in a first wireless device 22 according to some embodiments of the present disclosure. One or more Blocks and/or functions performed by first wireless device 22 may be performed by one or more elements of wireless device 22 such as by WD CORESET search unit 34 in processing circuitry 84, processor 86, radio interface 82, etc. In one or more embodiments, first wireless device 22 such as via one or more of processing circuitry 84, processor 86 and radio interface 82 is configured to receive (Block S142) an indication of an assignment of a control resource set, CORESET, search area identifier, CS-ID for the first wireless device 22, as described herein. In one or more embodiments, first wireless device 22 such as via one or more of processing circuitry 84, processor 86 and radio interface 82 is configured to receive (Block S143) signaling of a CORESET including data for the first wireless device 22 where the data is searchable within the CORESET based at least on an offset derivable from the CS-ID, as described herein.

According to one or more embodiments, the CORESET includes a bitmap including a plurality of bits associated with a plurality of wireless devices 22 where the processing circuitry 84 is configured to: determine the offset based at least on the CS-ID, where the offset is an offset into the bitmap that corresponds to a first bit of the plurality of bits that is associated with the first wireless device 22 where the first bit is configured to indicate whether the data is included in the CORESET for the first wireless device 22. According to one or more embodiments, the first bit corresponds to a first predefined value indicates for the first wireless device 22 to search for control data in the CORESET, where the first bit corresponds to a second predefined value indicates for the first wireless device 22 to skip searching for control data in the CORESET. According to one or more embodiments, the processing circuitry 84 is configured to determine the offset based at least on the CS-ID, where the offset is an offset into a common search area of the CORESET, the data included in the CORESET being positioned at the offset.

According to one or more embodiments, the processing circuitry 84 is configured to determine the offset based at least on the CS-ID, where the offset is an offset into a common search area of the CORESET, and where the data included in the CORESET is positioned only at the offset. According to one or more embodiments, the data included in the CORESET is positioned within a predefined range past the offset. According to one or more embodiments, the offset is based at least on an aggregation level associated with the CORESET. According to one or more embodiments, the processing circuitry 84 is further configured to determine the CS-ID based at least on one of: a random access preamble ID associated with the first wireless device 22; wireless device service type associated with the first wireless device 22; discontinuous reception, DRX, cycles associate with the first wireless device 22; and radio conditions associated with the first wireless device 22.

Having described the general process flow of arrangements of the disclosure and having provided examples of hardware and software arrangements for implementing the processes and functions of the disclosure, the sections below provide details and examples of arrangements for limiting unnecessary searching of the control area by sending an indication to a WD 22 that indicates if the WD 22 is to read a control resource set (CORESET) search space in a bandwidth part (BWP).

It is noted that references are made below to one or more of WD 22 and/or network node 16 performing certain functions. Functions performed by a network node 16 can be performed by one or more of the elements shown as comprised in network node 16, such as, but not limited to processing circuitry 68, node CORESET search unit 32, communication interface 60 and/or radio interface 62. Functions performed by a WD 22 can be performed by one or more of the elements shown as comprised in WD 22, such as, but not limited to processing circuitry 84, WD CORESET search unit 34, and/or radio interface 82.

Embodiments provide for limiting unnecessary searching of the control area such as by configuring an offset and/or sending an indication to a WD 22 that indicates if the WD 22 is to read a control resource set (CORESET) search space in a bandwidth part (BWP).

Radio Resource Control Changes

According to one or more embodiments, network node 16 procedure may start the procedure of wireless device 22 Capability Enquiry (inquiry) to a wireless device 22 in RRC_CONNECTED (after the initial setup) when network node 16 needs additional wireless device 22 radio access capability information. In one or more embodiments, a new field (compared with existing systems) is added inside the Phy-Parameters which is returned along with the wireless device 22 Capability Information in order to inform network node 16 that wireless device 22 supports this feature which optimizes searches for common search areas. The parameter OptimizedSearchTypeSupported (new information element (IE) or new with respect to existing 3GPP standards), described below, contains the variations of the new functionality as defined herein. For example, it can be defined/implemented as follows:

IE OptimizedSearchTypeSupported has the following field:

OptimizedSearchType BIT STRING (SIZE (3)) OPTIONAL,

Where
1. 000 no support for optimization (legacy way only)
2. MSB bit set 1 (1xx) means bitmap supported.
3. Middle bit set to (x1x) means exact match. The WD 22 uses the CS-ID to compute an offset into the common search area and decodes it.

4. LSB bit set to 1 (xx1) means the common search area is searched for a match stating at the offset computed from the CS-ID. The search continues until all area is covered or a match is found.

Note that bits can be combined to support multiple optimizations.

Example of standards change to support the new parameter:

```
UE-NR-CapabilityAddFRX-Mode ::= SEQUENCE {
    phy-ParametersFRX-Diff              Phy-ParametersFRX-Diff OPTIONAL,
    measAndMobParametersFRX-Diff        MeasAndMobParametersFRX-Diff OPTIONAL
}
Phy-ParametersFRX-Diff ::= SEQUENCE {
    dynamicSFI              ENUMERATED {supported}      OPTIONAL,
    dummy1                  BIT STRING (SIZE (2))       OPTIONAL,
    twoFL-DMRS              BIT STRING (SIZE (2))       OPTIONAL,
    dummy2                  BIT STRING (SIZE (2))       OPTIONAL,
    ...
    OptimizedSearchType     BIT STRING (SIZE (3))       OPTIONAL,
    ...
}
```

Control Plane Changes

Some embodiments may make use of a bitmap of size "searchIdentifiers" for the network node 16 to signal which WDs 22 may be meant to read a CORESET search space in a BWP. A WD 22 serviced by a cell may be allocated an ID from the range [0 . . . maxNrofUeIdentifiers−1] where maxNrofUeIdentifiers may be configurable.

In cases when the value of maxNrofUeIdentifiers is greater than the value of searchIdentifiers, the WD 22 may check the bitmap at bit position p=(maxNrofUeIdentifiers mod searchIdentifiers). If the position p is set to 0 then there may be no data transmitted for the WD 22, otherwise the WD 22 may continue searching as per 3rd Generation Partnership Project (3GPP) standard procedures.

As shown below in bold in the ControlResource Set IE, a bit map may be introduced by some embodiments.

```
-- ASN1START
-- TAG-CONTROLRESOURCESET-START
ControlResourceSet ::=          SEQUENCE {
    controlResourceSetId            ControlResourceSetId,
    frequencyDomainResources        BIT STRING (SIZE (45)),
    nrofIdentifiers                 INTEGER (1..maxNrofIdentifiers),  ,
    duration                        INTEGER (1..maxCoReSetDuration),
    cce-REG-MappingType             CHOICE {
        interleaved                     SEQUENCE {
            reg-BundleSize                  ENUMERATED {n2, n3, n6},
            interleaverSize                 ENUMERATED {n2, n3, n6},
            shiftIndex                      INTEGER(0..maxNrofPhysicalResourceBlocks-1) OPTIONAL -- Need S
        },
        nonInterleaved                  NULL
    },
    precoderGranularity             ENUMERATED {sameAsREG-bundle, allContiguousRBs},
    tci-StatesPDCCH-ToAddList       SEQUENCE(SIZE (1..maxNrofTCI-StatesPDCCH)) OF TCI-StateId OPTIONAL, -- Cond NotSIB1-initialBWP
    tci-StatesPDCCH-ToReleaseList   SEQUENCE(SIZE (1..maxNrofTCI-StatesPDCCH)) OF TCI-StateId OPTIONAL, -- Cond NotSIB1-initialBWP
    tci-PresentInDCI                ENUMERATED {enabled}                OPTIONAL, -- Need S
    pdcch-DMRS-ScramblingID         INTEGER (0..65535)                  OPTIONAL, -- Need S
    ...
}
-- TAG-CONTROLRESOURCESET-STOP
-- ASN1STOP
```

A bit set to one may indicate that the WD 22 or WDs 22 associated with the position of the bit have control data and therefore these WDs 22 may need to search the CORESET search area associated with the bitmap. A bit set to zero indicates that the WD 22 or WDs 22 associated with the position of the bit may not have control data and may not need to search the CORESET search area (i.e., one or more common search areas of the CORESET).

WD 22 Attachment Changes

WDs 22 may be assigned a CORESET search area identifier (CS-ID) by network node 16 in which the WD 22 may use the CS-ID to check to see if it may need to search for control data in a CORESET, as described herein.

When the WD 22 attaches to a new cell, e.g., new network node 16, as part of the attachment procedures, a CS-ID may be assigned to the WD 22. Two different example methods are described below as to how the CS-ID may be assigned to a WD 22 during initial attachment and during mobility.

When the WD 22 moves into a new cell, as part of the mobility procedures, a CS-ID may be assigned to the WD 22 by the network node 16. The control search area identifier may not be unique in the case when there are more WDs 22 than identifiers (IDs). For example, if 45 identifiers are allocated and there are more than 45 WDs 22, two or more WDs 22 may share the same control area search identifier. In this example, if there are two WDs 22 sharing an ID and only one of the two WDs 22 has control data in a CORESET, then both WDs 22 may search for the control data, but only one WD 22 may find it.

Note that the bitmap to indicate which WDs 22 have data may need to be added to the CORSET at a location known by the WDs 22.

Assigning the CS-ID to a WD 22 based on PRACH configuration index

Deriving the CS-ID for a WD 22 from the PRACH configuration index may have an advantage of not requiring new signaling between the network node 16 and the WD 22 to share the CS-ID assigned. This is the case given that both sides may deduce the index used by the other side once the preamble is received. Another advantage from the index randomizing may be to raise the probability of a better spreading of the WDs 22 across all available CS-ID.

The CS-ID may be derived from the PRACH configuration index that the WD 22 selects for the random access (RA) procedures (contention-based RA procedures).

The CS-ID may be derived from the PRACH configuration index that the network node 16 selects for a WD 22 for the contention-free RA procedure case.

The CS-ID may be calculated by network node and/or wireless device 22 as follows:
1. CS-ID=PRACH configuration index, when the maxNrofIdentifiers in FIG. 9 above is greater or equal to the number of preambles available (64 in LTE and 256 in NR/5G),
2. CS-ID=(PRACH configuration index) mod maxNrofIdentifiers,
3. Or some other mapping may be applied to derive the CS-ID from the preamble.

Changes to the Search Algorithm
1. The WD 22 may read the new bitmap and check the CS-ID assigned by network node 16.

CS-ID Assigned by Network Node 16

Figure 11:
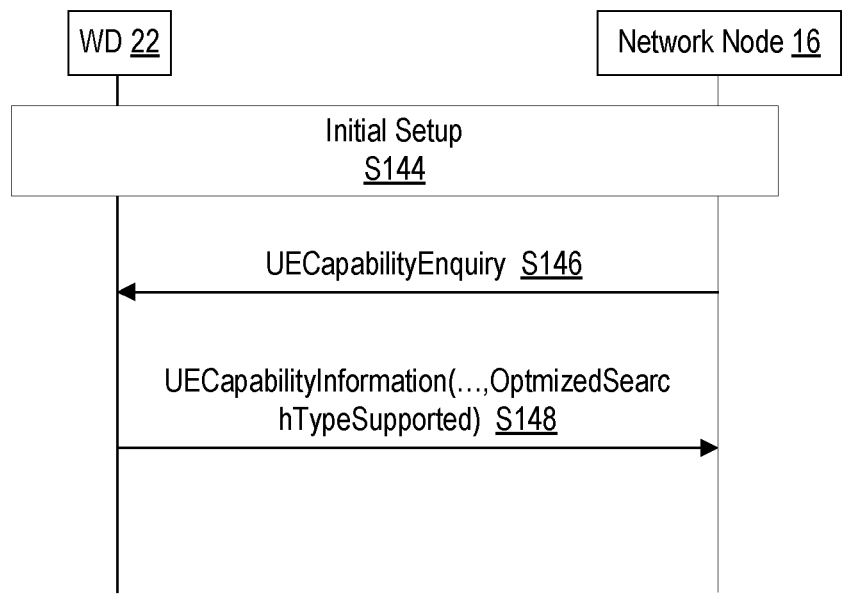
FIG. 11 is a flow diagram of an example communication flow between a network node and wireless device after initial setup according to some embodiments of the present disclosure.

FIG. 11 is an example signaling diagram of assigning a CS-ID according to one or more embodiments of the present disclosure. One or more Blocks and/or functions performed by network node 16 may be performed by one or more elements of network node 16 such as by node CORESET search unit 32 in processing circuitry 68, processor 70, communication interface 60, radio interface 62, etc. In one or more embodiments, network node 16 such as via one or more of processing circuitry 68, processor 70, radio interface 62 and communication interface 60 is configured to, after initial setup (Block S144), transmit (Block S146) UEcapabilityEnquiry to wireless device 22, as described herein. In one or more embodiments, network node 16 such as via one or more of processing circuitry 68, processor 70, radio interface 62 and communication interface 60 is configured to receive (Block S148) UECapabilityInformation ( . . . , OptimizedSearchTypeSupported) IE, as described herein. For example, the UECapabilityInformation ( . . . , OptimizedSearchTypeSupported) IE may indicate that wireless device 22 supports CORESET searching as described herein.

Figure 12:
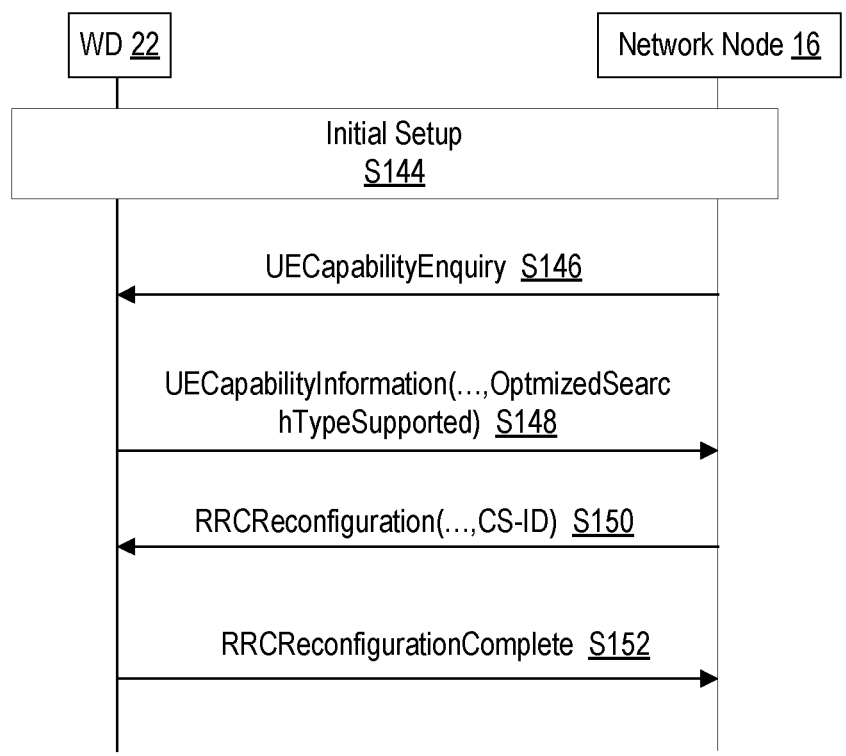
FIG. 12 is a flow diagram of another example communication flow between a network node and wireless device after initial setup according to some embodiments of the present disclosure.

FIG. 12 is an example signaling diagram of assigning a CS-ID according to one or more embodiments of the present disclosure. One or more Blocks and/or functions performed by network node 16 may be performed by one or more elements of network node 16 such as by node CORESET search unit 32 in processing circuitry 68, processor 70, communication interface 60, radio interface 62, etc. Blocks S144-S148 were described with respect to FIG. 11. In one or more embodiments, network node 16 such as via one or more of processing circuitry 68, processor 70, radio interface 62 and communication interface 60 is configured to transmit (Block S150) a RRCReconfiguration ( . . . , CS-ID) message to wireless device 22, as described herein. The RRC reconfiguration message may include and/or indication the CS-ID assigned to wireless device 22.

In one or more embodiments, network node 16 such as via one or more of processing circuitry 68, processor 70, radio interface 62 and communication interface 60 is configured to receive (Block S152) a RRCReconfigurationComplete message from WD 22, as described herein.

A second method to assign the CS-ID to a WD 22 during initial access or mobility scenarios, may be for the network node 16 to allocate the CS-ID to the WD 22 based on criteria such as:
- The number of WDs 22 are using a given CS-ID to try to balance the sharing of the different CS-IDs.
- The spread of WDs 22 across the different CS-IDs to minimize reuse which can cause unnecessary WD 22 searches when multiple WDs 22 may have the same CS-ID for the same search space.
- One way to help optimize the CS-ID allocation and usage may be to combine the following:
- CS-ID assigned to share with WDs 22 unlikely to collide. WDs 22 which require services with different requirements can share CS-IDs. For example, WD1 with VoIP call (with data packets every 20 ms and silence packets every 160 ms) can share a CS-ID with WD 22 with a voice over internet protocol (VoIP) call with the same requirements but with different system frame number (SFN)+slot offset from WD1 so that both WDs 22 may be scheduled in different slots.
- Combine the CS-ID with slot numbers to make it more unique and unlikely to collide on specific search areas.
- Select the slot numbers (to combine with the CS-ID) for a WD 22, based, for example, on the discontinuous reception (DRX) sleep and awake/active cycles for the WD 22.

The opposite approach may also be possible:
- CS-ID and slots may be selected first based on currently served WDs 22 to balance the resources, CS-ID and slots may be selected also based on the resource requirements of services required by the WD 22. Also, the quality of service (QoS) requirements of WDs 22 already sharing the same slots and resources may be considered.

The DRX cycles may be selected based on the selected CS-ID and slots.

Optimizing Search Area Searches with the CS-ID

The CS-ID can be used by wireless device 22 such as via processing circuitry 84, WD CORESET search unit 34, etc., as an offset into the search area to optimize the search. Network node 16 can either send the WD 22 data at the offset which is calculated below, or close to the offset, as follows:

Option 1: Offset varies for each aggregation level (i.e., an offset value may be based at least on one or more aggregation levels):

offset=CS-ID mod (search-area-size(aggregationLevel)) such that the offset is based at least on the CD-ID;

Option 2: Offset calculation is always the same location as the aggregationLevel_1 or after it:

offset=ceiling((CS-ID/aggregationLevel)) mod (search-area-size(aggregationLevel)) such that the offset is based at least on the CD-ID.

Where aggregationLevel is as defined by 3GPP standards: For example, one of {aggregation level 1, aggregation level 2, aggregation level 3}.

Once the offset is calculated, the offset can be used in two ways:

Option A: Network node 16 such as via processing circuitry 68, node CORESET search unit 32, etc., encodes wireless device 22 data exactly at the offset. In this case, WD 22 does not need to search at all and may need to decode the location at the offset for each aggregation level. If network node 16 needs to change the location of the data, then network node 16 may need to allocate a different CS-ID and signal it again to WD 22.

Option B: The WD 22 data is stored at the offset or after the offset but as close as possible to the offset to minimize the search. That is, in one or more embodiments, the data is stored or positioned within a pre-defined range from the offset. In this case, WD 22 starts the search at the offset and continues forward. If WD 22 reaches the end of the search area, the search continues at the start of the search area and until the whole search area is covered.

In one or more embodiments, either option 1 or 2 can be combined with either option A or B above.

Option A may require only that a CS-ID is assigned. Option 1 may not require the bitmap to be present to operate properly. For example, Option 1 without a bitmap can be used if network node 16 can store WD 22 data at the offset. Since there is no search, the bitmap is not required; however, in this case, if multiple WDs 22 share the same CS_ID, the decoding at offset may fail for WDs 22 not meant to decode that data.

In one or more embodiments, for Option 2, the CS-ID may be required, and the bitmap is optional. The bitmap helps in this case if WD 22 data tends to require long searches (i.e., if network node 16 is unsuccessful storing WD 22 data close to the offset.

Figure 13:
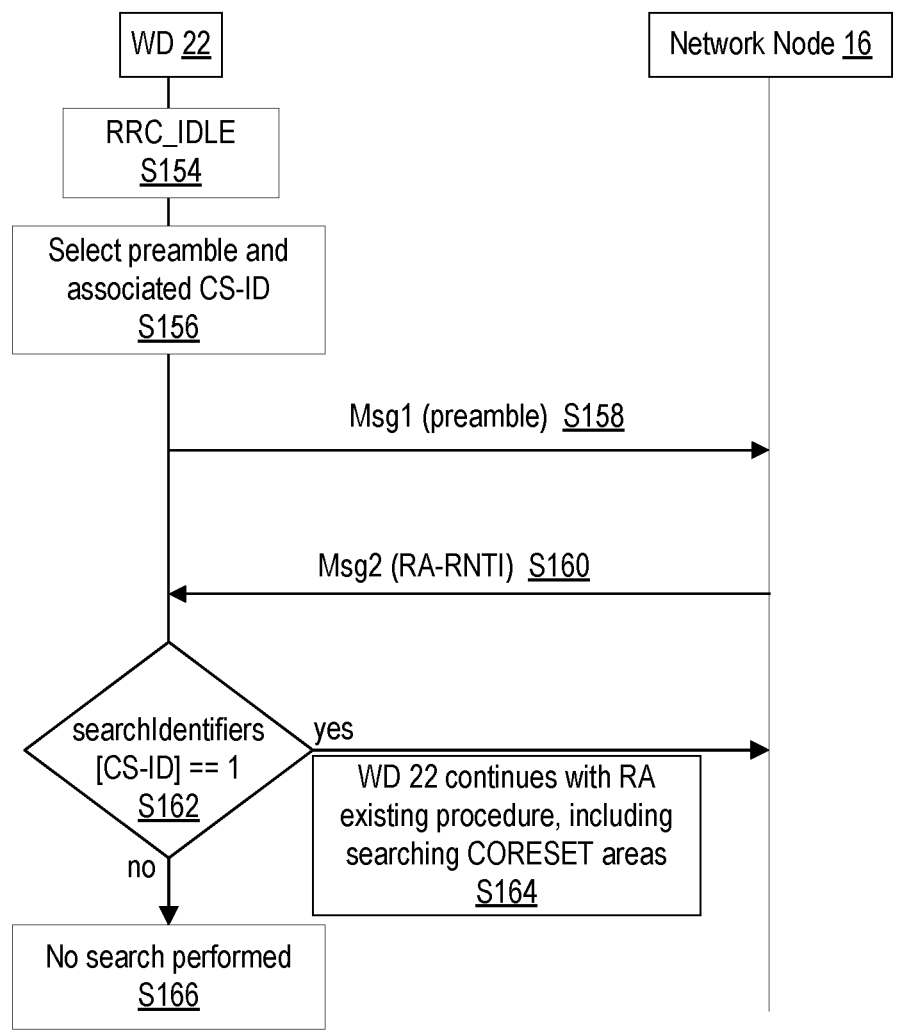
FIG. 13 is a flow diagram of another example communication flow between a network node and WD for a wireless device in idle mode according to some embodiments of the present disclosure.

FIG. 13 is an example flow diagram according to one or more embodiments of the present disclosure. One or more Blocks and/or functions performed by wireless device 22 may be performed by one or more elements of wireless device 22 such as by WD CORESET search unit 34 in processing circuitry 84, processor 86, radio interface 82, etc. In one or more embodiments, wireless device 22 such as via one or more of processing circuitry 84, processor 86 and radio interface 82 is configured to enter (Block S154) an RRC Idle state, as described herein. In one or more embodiments, wireless device 22 such as via one or more of processing circuitry 84, processor 86 and radio interface 82 is configured to select (Block S156) preamble and associated CS-ID, as described herein. In one or more embodiments, wireless device 22 such as via one or more of processing circuitry 84, processor 86 and radio interface 82 is configured to transmit (Block S158) a message 1 (Msg1 (preamble)) to network node 16, as described herein.

Figure 14:
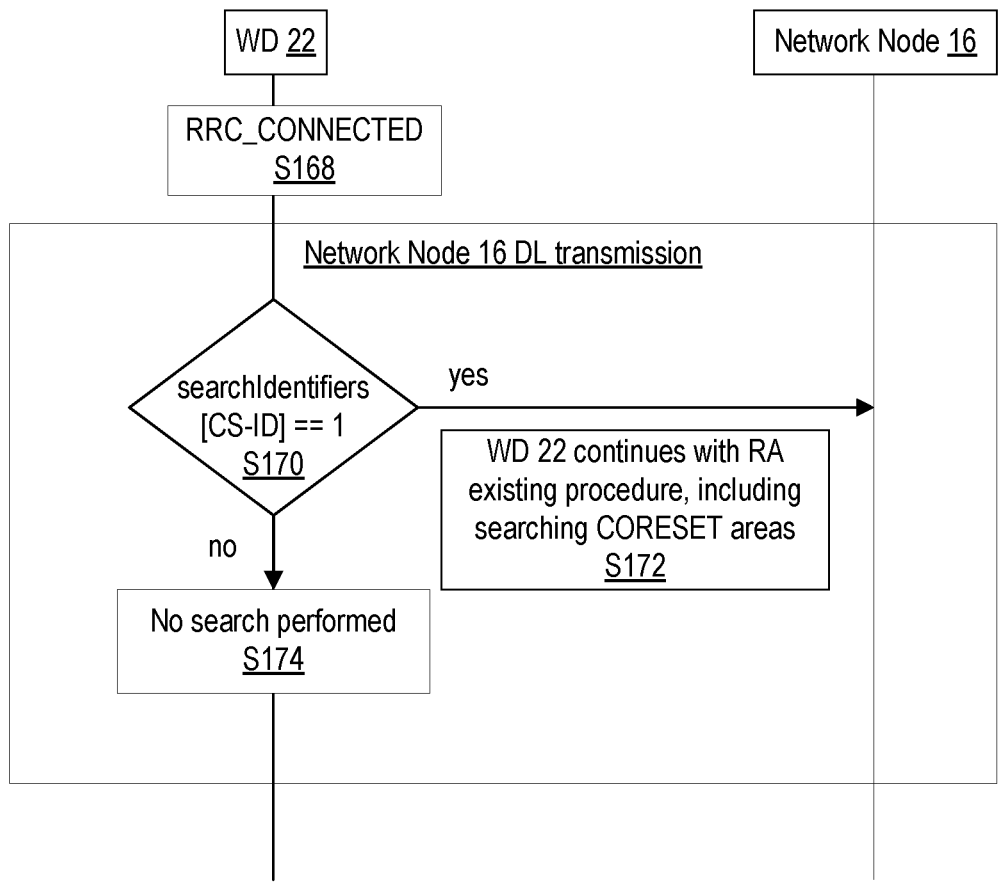
FIG. 14 is a flow diagram of another example communication flow between a network node and WD for a wireless device in connected mode according to some embodiments of the present disclosure.

In one or more embodiments, wireless device 22 such as via one or more of processing circuitry 84, processor 86 and radio interface 82 is configured to receive (Block S160) a message 2 (Msg2 (RA-RNTI)) from network node 16 as described herein. In one or more embodiments, wireless device 22 such as via one or more of processing circuitry 84, processor 86 and radio interface 82 is configured to determine (Block S162) whether search identifiers [CS-ID]==1, as described herein. In one or more embodiments, wireless device 22 such as via one or more of processing circuitry 84, processor 86 and radio interface 82 is configured to, if the [CS-ID]==1, continue (Block S164) with RA existing procedure including searching CORESEST areas, as described herein. In one or more embodiments, wireless device 22 such as via one or more of processing circuitry 84, processor 86 and radio interface 82 is configured to, if the [CS-ID] is not equal to 1, determine (Block S166) to not perform searching in CORESET areas, as described herein FIG. 14 is another example flow diagram according to one or more embodiments of the present disclosure. One or more Blocks and/or functions performed by wireless device 22 may be performed by one or more elements of wireless device 22 such as by WD CORESET search unit 34 in processing circuitry 84, processor 86, radio interface 82, etc. In one or more embodiments, wireless device 22 such as via one or more of processing circuitry 84, processor 86 and radio interface 82 is configured to enter (Block S168) RRC connected state, as described herein. In one or more embodiments, wireless device 22 such as via one or more of processing circuitry 84, processor 86 and radio interface 82 is configured to determine (Block S170) whether search identifiers [CS-ID]==1, as described herein.

In one or more embodiments, wireless device 22 such as via one or more of processing circuitry 84, processor 86 and radio interface 82 is configured to, if the determination is made that search identifiers [CS-ID]==1, continue (Blocks S172) with RS existing procedure including searching CORESET areas, as described herein. In one or more embodiments, wireless device 22 such as via one or more of processing circuitry 84, processor 86 and radio interface 82 is configured to, if the determination is made that search identifiers [CS-ID] do not equal 1, determine (Block S174) to not perform searching, as described herein. While one or more embodiments described herein use "1" as an example CS-ID, other values may be used in accordance with the principles of the disclosure.

Some Examples

Example A1. A network node 16 configured to communicate with a wireless device 22 (WD 22), the network node 16 configured to, and/or comprising a radio interface 62 and/or comprising processing circuitry 68 configured to:

send an indication to the WD 22 that indicates if the WD 22 is to read a control resource set (CORESET) search space in a bandwidth part (BWP).

Example A2. The network node 16 of Example A1, wherein sending the indication further comprises assigning a CORESET search area identifier (CS-ID) to the WD 22 that indicates if the WD is to read a CORESET search space in a BWP.

Example A3. The network node 16 of any one of Examples A1-A2, wherein the CS-ID identifies a position on a bitmap for the WD 22 to retrieve data from that indicates if the WD 22 is to read a CORESET search space in a BWP.

Example A4. The network node 16 of any one of Examples A1-A3, wherein the network node 16, and/or the radio interface 62 and/or the processing circuitry 68 is further configured to:

determine if there are at least two WDs 22 sharing a CORESET search area identifier (CS-ID); and if there are at least two WDs 22 sharing a CORESET search area identifier (CS-ID) and only one of the at least two WDs 22 has control data in a CORESET, send an indication to not search the CORESET to the WD 22 that does not have control data in CORESET.

Example A5. The network node 16 of any one of Examples A1-A4, wherein the CS-ID for the WD 22 is derived from a physical random-access Channel (PRACH) configuration index.

Example A6. The network node 16 of any one of Examples A1-A5, wherein the CS-ID is assigned to minimize interference between at least two WDs 22.

Example B1. A method implemented in a network node 16, the method comprising:

sending an indication to the WD 22 that indicates if the WD 22 is to read a control resource set (CORESET) search space in a bandwidth part (BWP).

Example B2. The method of Example B1, wherein sending the indication further comprises assigning a CORESET search area identifier (CS-ID) to the WD 22 that indicates if the WD 22 is to read a CORESET search space in a BWP.

Example B3. The method of any one of Examples B1-B2, wherein the CS-ID identifies a position on a bitmap for the WD 22 to retrieve data from that indicates if the WD 22 is to read a CORESET search space in a BWP.

Example B4. The method of any one of Examples B1-B3, further comprising:

determining if there are at least two WDs 22 sharing a CORESET search area identifier (CS-ID); and if there are at least two WDs 22 sharing a CORESET search area identifier (CS-ID) and only one of the at least two WDs 22 has control data in a CORESET, send an indication to not search the CORESET to the WD 22 that does not have control data in CORESET.

Example B5. The method of any one of Examples B1-B4, wherein the CS-ID for the WD is derived from a physical random-access Channel (PRACH) configuration index.

Example B6. The method of any one of Examples B1-B5, wherein the CS-ID is assigned to minimize interference between at least two WDs 22.

Example C1. A wireless device 22 (WD 22) configured to communicate with a network node 16, the WD 22 configured to, and/or comprising a radio interface 62 and/or processing circuitry 68 configured to:

receive an indication that indicates if the WD 22 is to read a control resource set (CORESET) search space in a bandwidth part (BWP).

Example C2. The WD 22 of Example C1, wherein receiving the indication further comprises receiving a CORESET search area identifier (CS-ID) that indicates if the WD 22 is to read a CORESET search space in a BWP.

Example C3. The WD 22 of any one of Examples C1-C2, wherein the CS-ID identifies a position on a bitmap for the WD 22 to retrieve data from that indicates if the WD 22 is to read a CORESET search space in a BWP.

Example D1. A method implemented in a wireless device 22 (WD 22), the method comprising:

receiving an indication that indicates if the WD 22 is to read a control resource set (CORESET) search space in a bandwidth part (BWP).

Example D2. The method of Example D1, wherein receiving the indication further comprises receiving a CORESET search area identifier (CS-ID) that indicates if the WD 22 is to read a CORESET search space in a bandwidth part (BWP).

Example D3. The method of any one of Examples D1-D2, wherein the CS-ID identifies a position on a bitmap for the WD 22 to retrieve data from that indicates if the WD 22 is to read a CORESET search space in a bandwidth part (BWP)

Some More Examples

The network node 16 assigns a CS-ID to WD 22 using one or more of the following criteria:

1. The CS-ID is derived, partially or fully, from the random access preamble ID associated with the WD 22. In one or more embodiments, the random access preamble ID is either randomly selected by WD 22 during initial attachment (Contention-based random access), or assigned by network node 16 during mobility (Contention-free random access).

2. The CS-ID is derived by network node 16 from multiple criteria related to WD 22 and other WDs 22 in the system, such as service types, DRX sleeping/awake cycles, etc. One reason for considering multiple criteria is to allow the same CS-ID to be shared by WDs 22 which are more likely to receive data in common search areas at different times.

3. The CS-ID is assigned based on radio conditions (Link adaptation). The CS-ID is assigned to WD 22 is based on the location in the search area where the signal strength is better for that WD 22. In this case, the CS-ID changes as the radio conditions change for WD 22 and the network node 16 needs to send the new CS-Id to WD 22 whenever it changes.

Option 1A: Including a bitmap (bit array) with CORESET containing common search areas Network node 16 side: A bitmap is added by network node 16 to a CORESET which contains a common search area. A bit set to 1 indicates there is data for WD 22, zero indicates that there is no data for WD 22 associated with that bit in the array. A CS-ID is used to calculate the offset into the array.

WD 22 side: WD 22 may need to signal to network node 16 (during capability exchange) the support for this option. If WD 22 supports this option as may be determined by WD configuration, WD 22 uses its CS-ID to calculate the offset into the bitmap to check if there is data for it before attempting to search the common area.

Option 2B: Exact match (can be combined with Option 1A above, or used alone)

Network node 16 side: network node 16 encodes data for WD 22, in the common search area, only at the offset associated with the CS-ID assigned to the WD 22. The are some variations of the actual offset used, as described herein, depending on the aggregation levels are used to compute the offset.

WD 22 side: WD 22 may need to signal to network node 16 (during capability exchange) the support for this option.

WD 22 uses the CS-ID to compote an offset to decode data in the common search area. The offset may vary if WD 22 tries deferent aggregation levels. WD 22 attempt to decode data at "offset" will fail if the data is not meant for WD 22 (e.g., CS-ID shared and network node 16). For this option, the WD 22 does not search the common search area if the exact math at the offsets fail for all aggregation levels.

Option 3C: WD 22 searches the common search area stating at position "offset". This option can be combined with option 1 above, or use alone.

Network node 16 side: network node 16 attempts to store WD 22 data at the offset or past the offset but as close to the offset as possible to minimize the search. In one or more embodiments, network node 16 may store and/or position data for WD 22 within a predefined range of the offset. The offset is compute as in option 2B, based on the CS-ID assigned to WD 22 which owns the data to be sent/encode.

WD 22 side: WD 22 may need to signal to network node 16 (during capability exchange) the support for this option. WD 22 searches the common search area starting at the offset which WD 22 derives from the CS-ID. WD 22 continues to search the common search area until a match is found or the whole area is searched. When the WD 22 encounters the search area end, it goes to the beginning of the search area until the whole are is covered or a match is found.

Note that network node 16 stores WD 22 data as close to the offset as possible where, in one or more embodiments, WD 22 searches all aggregation levels simultaneously to optimize the search. For example, WD 22 attempts to decode aggregation level 3 at the associated offset, followed by aggregation level 2, followed by level 1. Then continue with level 1 until the next level 2 is reached and the try level 2, and so on.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node for communicating with a first wireless device, the network node comprising:
processing circuitry comprising a processor and memory, the processing circuitry configured to:
receive capability information from the first wireless device, the capability information indicating whether the wireless device is configured for offset based control resource set, CORESET, searching;
assign a CORESET search area identifier, CS-ID, to a first wireless device based at least on the received capability information; and
cause signaling of a CORESET including data for a first wireless device, the data being searchable within the CORESET based at least on an offset derivable from the CS-ID.

2. The network node of claim 1, wherein the CORESET includes a bitmap including a plurality of bits associated with a plurality of wireless devices, the offset associated with the CS-ID being an offset into the bitmap that corresponds to a first bit of the plurality of bits that is associated with the first wireless device, the first bit configured to indicate whether the data is included in the CORESET for the first wireless device.

3. The network node of claim 2, wherein the first bit corresponds to a first predefined value indicates for the first wireless device to search for control data in the CORESET; and
the first bit corresponding to a second predefined value indicates for the first wireless device to skip searching for control data in the CORESET.

4. The network node of claim 1, wherein the offset associated with the CS-ID corresponds to an offset into a common search area of the CORESET; and
the data included in the CORESET being positioned at the offset.

5. The network node of claim 4, wherein the data is encoded for the first wireless device, in the common search area of the CORESET, only at the offset.

6. The network node of claim 4, wherein the data is encoded for the first wireless device, in the common search area of the CORESET, within a predefined range past the offset.

7. The network node of claim 1, wherein the processing circuitry is further configured to determine the offset using the CS-ID.

8. The network node of claim 1, wherein the offset is based at least on an aggregation level associated with the CORESET.

9. The network node of claim 1, wherein the processing circuitry is further configured to determine the CS-ID based at least on one of:
a random access preamble ID associated with the first wireless device;
wireless device service type associated with the first wireless device;
discontinuous reception, DRX, cycles associate with the first wireless device;
radio conditions associated with the first wireless device; and
physical random access channel configuration index associated with the first wireless device.

10. A first wireless device for communicating with a network node, the first wireless device comprising:
processing circuitry comprising a processor and memory, the processing circuitry configured to:
cause transmission of capability information to the network node, the capability information indicating whether the wireless device is configured for offset based control resource set, CORESET, searching;
receive an indication of an assignment of a CORESET search area identifier, CS-ID for the first wireless device, the assignment of the CS-ID being based on the capability information; and
receive signaling of a CORESET including data for the first wireless device, the data being searchable within the CORESET based at least on an offset derivable from the CS-ID.

11. The first wireless device of claim 10, wherein the CORESET includes a bitmap including a plurality of bits associated with a plurality of wireless devices;
the processing circuitry configured to:
determine the offset based at least on the CS-ID, the offset being an offset into the bitmap that corresponds to a first bit of the plurality of bits that is associated with the first wireless device, the first bit configured to indicate whether the data is included in the CORESET for the first wireless device.

12. The wireless device of claim 11, wherein the first bit corresponds to a first predefined value indicates for the first wireless device to search for control data in the CORESET; and
the first bit corresponds to a second predefined value indicates for the first wireless device to skip searching for control data in the CORESET.

13. The wireless device of claim 10, wherein the processing circuitry is configured to determine the offset based at least on the CS-ID, the offset being an offset into a common search area of the CORESET, the data included in the CORESET being positioned at the offset.

14. The wireless device of claim 10, wherein the processing circuitry is configured to determine the offset based at least on the CS-ID, the offset being an offset into a common search area of the CORESET, the data included in the CORESET being positioned only at the offset.

15. The wireless device of claim 10, wherein the data included in the CORESET is positioned within a predefined range past the offset.

16. The wireless device of claim 10, wherein the offset is based at least on an aggregation level associated with the CORESET.

17. The wireless device of claim 10, wherein the processing circuitry is further configured to determine the CS-ID based at least on one of:
a random access preamble ID associated with the first wireless device;
wireless device service type associated with the first wireless device;
discontinuous reception, DRX, cycles associate with the first wireless device; and
radio conditions associated with the first wireless device.

18. A method for a network node for communicating with a first wireless device, the method comprising:
receiving capability information from the first wireless device, the capability information indicating whether the wireless device is configured for offset based control resource set, CORESET, searching;
assigning a CORESET search area identifier, CS-ID, to a first wireless device based at least on the received capability information; and causing signaling of a CORESET including data for a first wireless device, the data being searchable within the CORESET based at least on an offset derivable from the CS-ID.

19. The method of claim 18, wherein the CORESET includes a bitmap including a plurality of bits associated with a plurality of wireless devices, the offset associated with the CS-ID being an offset into the bitmap that corresponds to a first bit of the plurality of bits that is associated with the first wireless device, the first bit configured to indicate whether the data is included in the CORESET for the first wireless device.

* * * * *